(12) United States Patent
Zhang et al.

(10) Patent No.: US 12,521,692 B2
(45) Date of Patent: Jan. 13, 2026

(54) CONTINUOUS PRODUCTION SYSTEM FOR ALCOHOL ESTER C-12

(71) Applicant: Runtai New Material Co., Ltd., Taizhou (CN)

(72) Inventors: Shiyuan Zhang, Taizhou (CN); Wenguo Song, Taizhou (CN); Xiaosong Lu, Taizhou (CN)

(73) Assignee: Runtai New Material Co., Ltd., Taizhou (CN)

( * ) Notice: Subject to any disclaimer, the term of this patent is extended or adjusted under 35 U.S.C. 154(b) by 93 days.

(21) Appl. No.: 17/785,926

(22) PCT Filed: Sep. 13, 2021

(86) PCT No.: PCT/CN2021/117983
§ 371 (c)(1),
(2) Date: Jun. 16, 2022

(87) PCT Pub. No.: WO2023/272948
PCT Pub. Date: Jan. 5, 2023

(65) Prior Publication Data
US 2024/0182402 A1 Jun. 6, 2024

(30) Foreign Application Priority Data
Jun. 30, 2021 (CN) ............ 202110736208.X

(51) Int. Cl.
*B01J 19/32* (2006.01)
*B01D 3/00* (2006.01)
*C07C 67/08* (2006.01)
*C07C 67/44* (2006.01)
*C07C 67/48* (2006.01)

(52) U.S. Cl.
CPC .......... *B01J 19/32* (2013.01); *B01D 3/009* (2013.01); *C07C 67/08* (2013.01); *C07C 67/44* (2013.01); *C07C 67/48* (2013.01); *B01J 2219/32237* (2013.01); *B01J 2219/32262* (2013.01)

(58) Field of Classification Search
None
See application file for complete search history.

(56) References Cited

U.S. PATENT DOCUMENTS 3,718,689 A * 2/1973 McCain ............... C07C 67/44
560/1
5,180,847 A 1/1993 Thurman et al.

FOREIGN PATENT DOCUMENTS

| CN | 107698446 A | * | 2/2018 | |
|---|---|---|---|---|
| CN | 109569488 A | * | 4/2019 | ............ B01D 3/009 |
| CN | 212504665 U | * | 2/2021 | |
| KR | 100446650 B1 | * | 9/2004 | |

* cited by examiner

Primary Examiner — Jennifer A Leung
(74) Attorney, Agent, or Firm — IPRTOP LLC

(57) ABSTRACT

A continuous production system for alcohol ester C-12 is provided, comprising: a feedstock tank, a reaction tower, an atmospheric distillation tower, a vacuum distillation tower, a condenser, a water washing tower, a dehydration tower, an evaporator, a light component removal tower, and a rectifying tower that are all connected with each other through pipelines. The continuous production system for alcohol ester C-12 replaces the traditional intermittent production process with the advantages of good batch stability, less by-products, and high yield.

6 Claims, 2 Drawing Sheets

CONTINUOUS PRODUCTION SYSTEM FOR ALCOHOL ESTER C-12

CROSS REFERENCE TO RELATED APPLICATION

This is a Sect. 371 National Stage application of a PCT International Application No. PCT/CN2021/117983, filed on Sep. 13, 2021, which claims priority to Chinese Patent Application No. 202110736208X, filed with the China National Intellectual Property Administration on Jun. 30, 2021 and entitled "CONTINUOUS PRODUCTION SYSTEM FOR ALCOHOL ESTER C-12", which is incorporated herein by reference in its entirety.

TECHNICAL FIELD

The present disclosure relates to the field of organic synthesis, and in particular to a continuous production system for alcohol ester C-12.

BACKGROUND

Alcohol ester C-12 is the most widely used a film-forming coalescent of architectural coatings, whose scientific name is 2,2,4-trimethyl-1,3-pentanediol monoisobutyrate, commercial name is alcohol ester C-12, molecular formula is $C_{12}H_{24}O_3$, relative molecular mass is 216.31 (provided by 2016 international relative atomic mass), and structural formula is as follows:

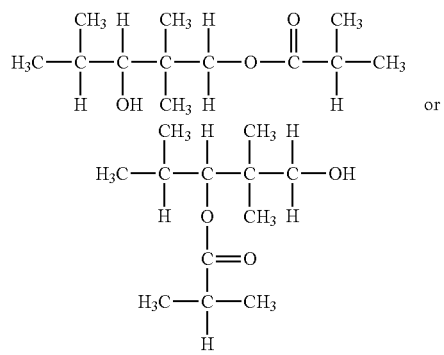

Compared with common film-forming coalescent, alcohol ester C-12 has many advantages, such as good resin compatibility, low dosage, low film-forming temperature, good film levelling property, good color development property, low freezing point, good hydrolytic stability, and low toxicity. Therefore, alcohol ester C-12 is an excellent film-forming coalescent for latex paints, which can be effectively used in polyvinyl acetate homopolymers, copolymers and trimers, as well as used in latexes such as pure acrylic acid, styrene or acrylic acid, polybutylstyrene and vinyl acetate. There are many manufacturers of alcohol ester C-12 in the market, and the quality of alcohol ester C-12 produced by different manufacturers varies greatly. The quality has a significant impact on the performance of the coatings, especially water resistance, storage stability, scrub resistance, and the like. At present, a synthesis process of alcohol ester C-12 is mainly based on consecutive aldol condensation, cannazalol reaction and esterification of isobutyraldehyde in the presence of an alkaline catalyst, the total reaction equation is as follows:

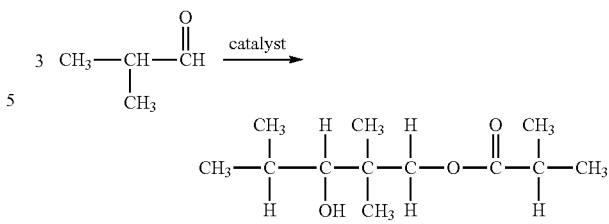

and equations for the stepwise reaction are as follows:

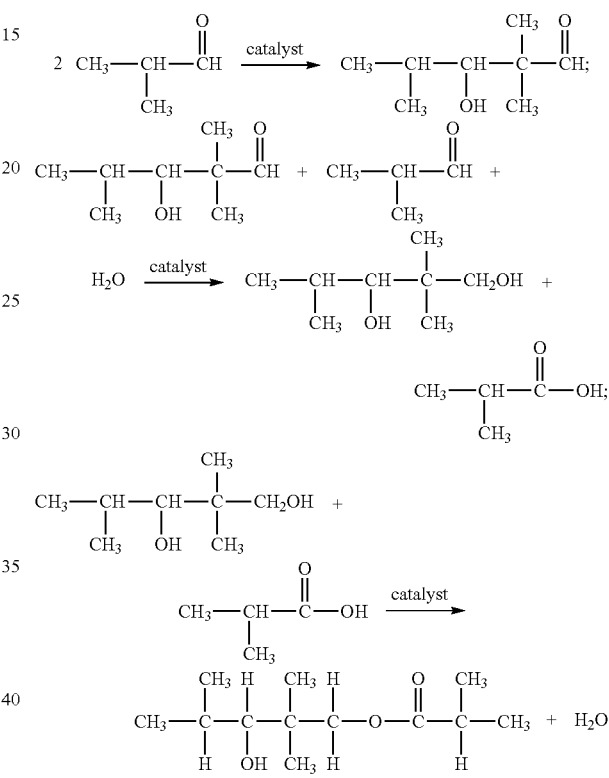

2,2,4-trimethyl-1,3-pentanediol and isobutyric acid obtained from the stepwise reaction undergo an esterification reaction to synthesize alcohol ester C-12 in the presence of a catalyst. There are a large number of side reactions within the reaction system apart from the above main reactions, which lead to a large number of by-products, and thus causing many problems, such as the purity of alcohol ester C-12. At present, most of the alcohol ester C-12 is produced by an intermittent production process, which has many problems, such as batch instability, more by-products, low yield, and so on.

SUMMARY

The present disclosure provides a continuous production system for alcohol ester C-12. The system adopts a continuous production process to prepare alcohol ester C-12, which greatly improves the production efficiency, the purity and the yield of alcohol ester C-12.

The continuous production system for alcohol ester C-12, including: a feedstock tank, the feedstock tank includes an inlet end of the feedstock tank and an outlet end of the feedstock tank; a reaction tower, an inlet end of the reaction tower is connected with the outlet end of the feedstock tank, the reaction tower includes a first outlet end of the reaction tower and a second outlet end of the reaction tower; an atmospheric distillation tower, an inlet end of the atmospheric distillation tower is connected with the first outlet end of the reaction tower, the atmospheric distillation tower includes a first outlet end of the atmospheric distillation tower and a second outlet end of the atmospheric distillation tower; a condenser, the condenser includes a first inlet end of the condenser and a second inlet end of the condenser, the first inlet end of the condenser is connected with the second outlet end of the reaction tower, the second inlet end of the condenser is connected with the second outlet end of the atmospheric distillation tower, an outlet end of the condenser is connected with the inlet end of the feedstock tank; a vacuum distillation tower, an inlet end of the vacuum distillation tower is connected with the first outlet end of the atmospheric distillation tower, the vacuum distillation tower includes a first outlet end of the vacuum distillation tower and a second outlet end of the vacuum distillation tower, the second outlet end of the vacuum distillation tower is connected with the inlet end of the reaction tower; a water washing tower, an inlet end of the water washing tower is connected with the first outlet end of the vacuum distillation tower; a dehydration tower, an inlet end of the dehydration tower is connected with an outlet end of the water washing tower; an evaporator, an inlet end of the evaporator is connected with an outlet end of the dehydration tower; a light component removal tower, an inlet end of the light component removal tower is connected with an outlet end of the evaporator and a rectifying tower, an inlet end of the rectifying tower is connected with an outlet end of the light component removal tower.

In an embodiment, the feedstock tank, the reaction tower, the atmospheric distillation tower, the vacuum distillation tower, the condenser, the water washing tower, the dehydration tower, the evaporator, the light component removal tower, the rectifying tower are connected with each other by multiple pipelines, a portion of pipelines are provided with material transfer pumps.

In an embodiment, the reaction tower has a structure of a square groove reactor, the square groove reactor includes 4 to 6 layers of square grooves arranged in series.

In an embodiment, a height of the reaction tower is in a range of 6 m to 8 m, a diameter of the reaction tower is in a range of 700 mm to 800 mm, a vertical distance between two adjacent square grooves in the square groove reactor is in a range of 200 mm to 300 mm, and a height of a square groove located at the bottom of the square groove reactor is 0.5 to 0.6 times an overall height of the reaction tower.

In an embodiment, the vacuum distillation tower is further provided with a third outlet end of the vacuum distillation tower.

In an embodiment, a heating temperature at the bottom of the reaction tower is in a range of 75° C. to 80° C.

In an embodiment, the feedstock tank includes a first feedstock tank and a second feedstock tank, the first feedstock tank and the second feedstock tank are arranged in parallel, the first feedstock tank is used to contain isobutyraldehyde and the second feedstock tank is used to contain an aqueous solution of catalyst, the isobutyraldehyde and the aqueous solution of the catalyst are pumped into the reaction tower from top to bottom.

In an embodiment, a ratio of a mass flow of the isobutyraldehyde to a mass flow of the aqueous solution of the catalyst is (25 to 50):1.

In an embodiment, the system further including: an alcohol ester C-16 feedstock tank, the alcohol ester C-16 feedstock tank is connected with an outlet end at the bottom of the rectifying tower.

As described above, the present disclosure changes a production route of alcohol ester C-12 from a traditional intermittent kettle-type production process to a continuous tower-type reaction process through continuous reactions, which effectively improves the batch stability of alcohol ester C-12, thereby improving the purity and the yield of alcohol ester C-12. Besides, a unit consumption of alcohol ester C-12 is reduced from 1.1 to 1.04.

The present disclosure designs multiple reflux recovery systems, and a separation and purification unit for separating by-products layer by layer, which result in low unit consumption, high purity and batch stability of alcohol ester C-12. In addition, the final reaction solution obtained from the system is of high purity and can be subsequently used as the feedstock of alcohol ester C-16, which is an energy-saving, environment-friendly and green cycle synthesis process.

DETAILED DESCRIPTION OF THE PREFERRED EMBODIMENTS

The embodiments of the present disclosure will be described below through specific examples. One skilled in the art can easily understand other advantages and effects of the present disclosure according to the contents disclosed in the description. The present disclosure may also be implemented or applied through other different embodiments, and various modifications or changes may be made to all details in the description based on different points of view and applications without departing from the spirit of the present disclosure.

Figure 1:
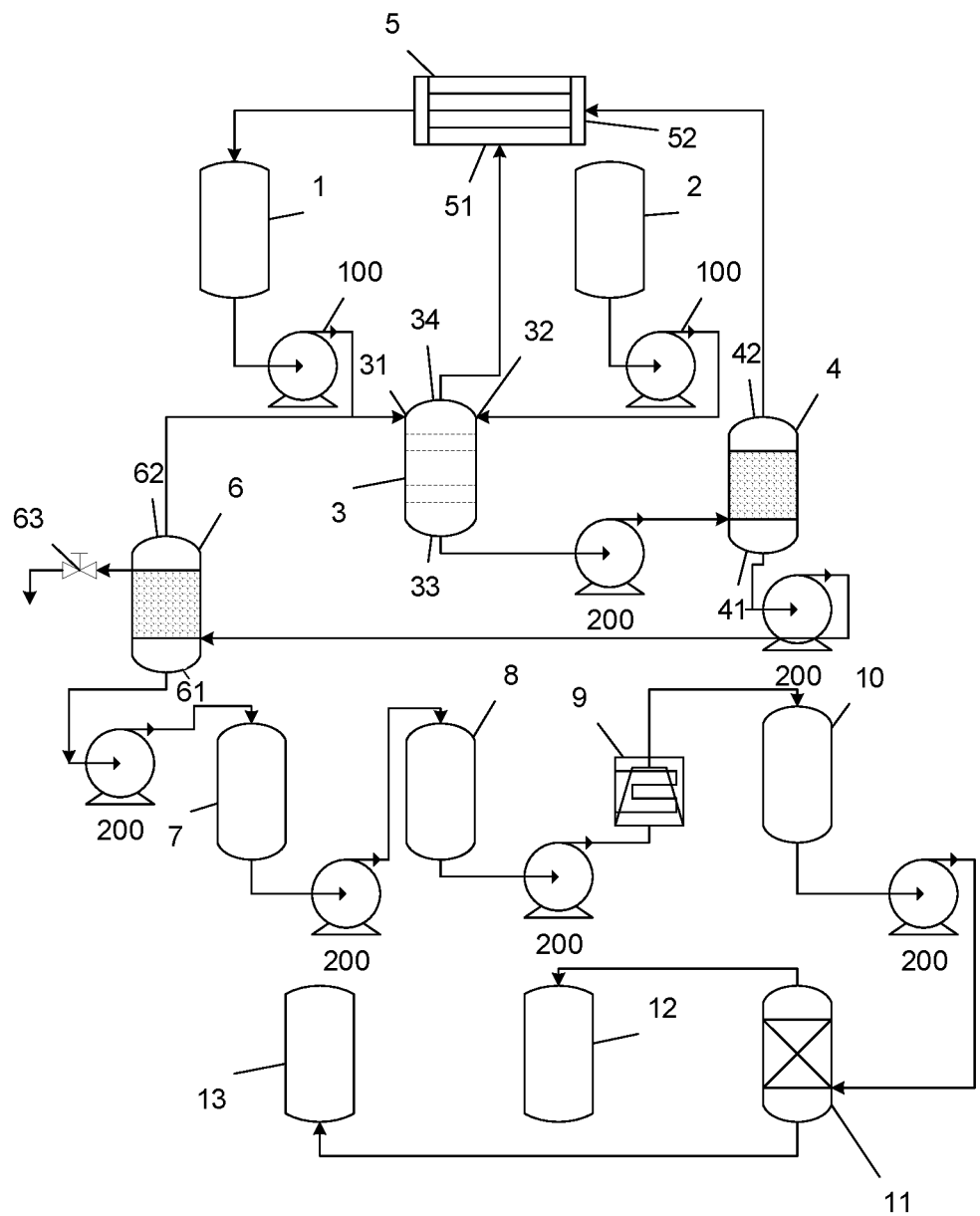
FIG. 1 is a schematic diagram of a continuous production system according to an embodiment in the present disclosure.

Referring to FIG. 1, the present disclosure provides a continuous production system for alcohol ester C-12. The system includes various unit operations connected with each other through multiple pipelines, some of the pipelines may be used to transport materials by adopting material transfer pumps, and each material transfer pump may include a metering pump 100, a discharging pump 200, or the like.

As shown in FIG. 1, the system includes feedstock tanks (1, 2). The feedstock tanks (1, 2) may be used to contain and store synthetic feedstock of alcohol ester C-12. The synthetic feedstock includes isobutyraldehyde and an alkaline catalyst. The feedstock tanks (1, 2) include a first feedstock tank 1 and a second feedstock tank 2, where the first feedstock tank 1 is used to contain isobutyraldehyde, and the second feedstock tank 2 is used to contain an aqueous solution of the alkaline catalyst. The pipelines connected with the outlet ends of the feedstock tanks (1, 2) are both provided with metering pumps 100 which may quantitatively pump the feedstock in the feedstock tanks (1, 2) into the subsequent reaction equipment. The alkaline catalyst may be one of potassium hydroxide, sodium hydroxide, calcium hydroxide, barium hydroxide, or a combination thereof. In some embodiments, the alkaline catalyst includes sodium hydroxide, calcium hydroxide, and barium hydroxide, and a weight ratio of sodium hydroxide, calcium hydroxide, and barium hydroxide is (3~5):(1~2):(1~2). The aqueous solution of the alkaline catalyst is obtained by mixing solid catalyst with water in a weight ratio of (1~2):1.

Figure 2:
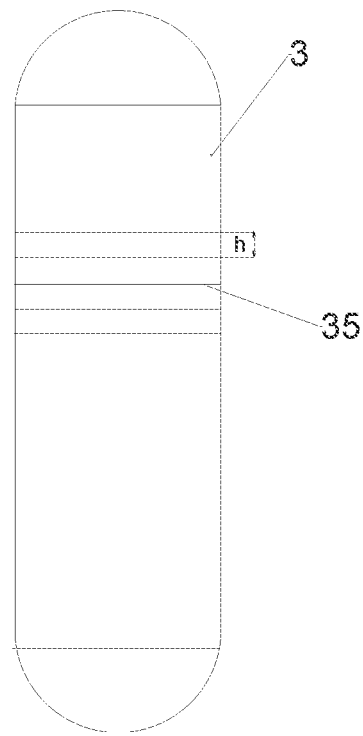
FIG. 2 is a schematic diagram of a structure of a reaction tower according to an embodiment in the present disclosure.

As shown in FIGS. 1 and 2, the continuous production system includes a reaction tower 3 and the synthesis reactions of alcohol ester C-12 are finished inside the reaction tower 3. A top of the reaction tower 3 may be provided with a first inlet end 31 and a second inlet end 32, and the feedstock in the feedstock tanks (1, 2) may be pumped into the reaction tower 3 through the inlet ends (31, 32) of the reaction tower 3, so that isobutyraldehyde may react in the presence of the alkaline catalyst. The reaction tower 3 has a structure of a square groove reactor, and the square groove reactor includes multiple layers of square grooves arranged in series. For example, 4~6 layers of square grooves 35 arranged in series are set in the reaction tower. In an embodiment, the number of layers of the square grooves 35 is 5, and the length of each square groove 35 is in a range of 400 mm to 600 mm. Each square groove is connected with each other through a throughhole at the bottom of each square groove. The structure of the square groove reactor with square grooves inside the reaction tower 3 improves the conversion rate and the yield of the synthesis reactions. The feedstock in the feedstock tanks (1, 2) is pumped into the reaction tower 3 from the inlet ends (31, 32) of the reaction tower 3 and finally flows to a bottom of the reaction tower 3. A heating temperature at the bottom of the reaction tower 3 is in a range of 75° C. to 80° C., in which isobutyraldehyde reacts in the presence of the alkaline catalyst at atmospheric pressure. In an embodiment, the height of the reaction tower 3 ranges from 6 m to 8 m, the diameter of the reaction tower 3 ranges from 700 mm to 800 mm, a vertical distance h between two adjacent square grooves in the square groove reactor ranges from 200 mm to 300 mm, and the height of the square groove located at the bottom of the square groove reactor is 0.5 to 0.6 times the overall height of the reaction tower 3.

In some embodiments, isobutyraldehyde in the first feedstock tank 1 is pumped into the reaction tower 3 from top to bottom and the aqueous solution of the alkaline catalyst in the second feedstock tank 2 is pumped into the reaction tower 3 from top to bottom. When a liquid level in a tower kettle of the reaction tower 3 reaches 30%~50% of the height of the tower kettle, the reaction tower 3 is heated. When the temperature at the bottom of the reaction tower 3 is heated to 80° C., the discharge starts and a ratio of a mass flow rate of isobutyraldehyde to a mass flow rate of the aqueous solution of the catalyst is (25~50):1. The above reaction tower enables isobutyraldehyde and the aqueous solution of the alkaline catalyst to meet in the reverse direction in the square groove reactor and react layer by layer. The conversion rate of alcohol ester C-12 is improved and the occurrence of side reactions is reduced by designing the square groove reactor in the reaction tower 3.

As shown in FIG. 1, the reaction tower 3 includes a first outlet end 33 located at the bottom of the reaction tower 3 and a second outlet end 34 located at the top of the reaction tower 3. The first outlet end 33 of the reaction tower 3 is connected with the subsequent separation equipment of the system, therefore, the reaction solution located at the bottom of the reaction tower 3 is pumped into the subsequent separation equipment. The second outlet end 34 of the reaction tower 3 transports the excess isobutyraldehyde from the reaction tower 3 to the first feedstock tank 1.

As shown in FIG. 1, the continuous production system also includes an atmospheric distillation tower 4. The atmospheric distillation tower 4 is used to remove the excess isobutyraldehyde from the reaction solution. An inlet end of the atmospheric distillation tower 4 is connected with the first outlet end 33 of the reaction tower 3. The temperature of a tower kettle of the atmospheric distillation tower 4 ranges from 150° C. to 160° C. The atmospheric distillation tower 4 includes two outlet ends, for example, a first outlet end 41 located at the bottom of the atmospheric distillation tower 4 and a second outlet end 42 located at the top of the atmospheric distillation tower.

As shown in FIG. 1, the continuous production system further includes a condenser 5. The condenser 5 includes a first inlet end 51 and a second inlet end 52. The first inlet end 51 of the condenser 5 is connected with the second outlet end 34 of the reaction tower 3, the second inlet end 52 of the condenser 5 is connected with the second outlet end 42 of the atmospheric distillation tower 4. In an embodiment, the condenser 5 is a multi-stage condenser, such as a three-stage condenser. The condenser 5 condenses and recovers the excess isobutyraldehyde in the reaction tower 3 and the atmospheric distillation tower 4, and transports isobutyraldehyde with the water removed to the first feedstock tank 1.

As shown in FIG. 1, the continuous production system also includes a vacuum distillation tower 6. The pressure in the vacuum distillation tower 6 ranges from −0.08 MPa to −0.1 MPa, and the temperature of a tower kettle of the vacuum distillation tower 6 ranges from 160° C. to 170° C. The vacuum distillation tower 6 discharges a portion of isobutyraldehyde and a portion of by-products (e.g., isobutanol) from the continuous production system. The portion of isobutyraldehyde is cycled to the reaction tower 3 through the pipelines to react. The portion of isobutanol is discharged from the system through other outlets of the vacuum distillation tower 6. In some embodiments, the vacuum distillation tower 6 includes multiple outlet ends, for example, a first outlet end 61, a second outlet end 62 and a third outlet end 63. The first outlet end 61 is connected with the subsequent washing equipment. The second outlet end 62 transports the portion of the separated isobutyraldehyde to the reaction tower 3 for reacting. The third outlet end 63 discharges impurities, such as isobutanol. Isobutanol is a by-product produced by the following reaction:

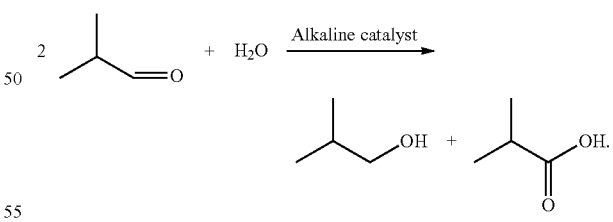

As shown in FIG. 1, the continuous production system also includes a water washing tower 7. The water washing tower 7 washes a dealdehyde reaction solution from the atmospheric distillation tower 4 and the vacuum distillation tower 6 to further remove impurities from the dealdehyde reaction solution, the water washing tower 7 removes water-soluble substances (e.g., potassium isobutyrate) from the dealdehyde reaction solution. The potassium isobutyrate is a by-product of a reaction between potassium hydroxide and isobutyric acid, and the reaction equation is as follows:

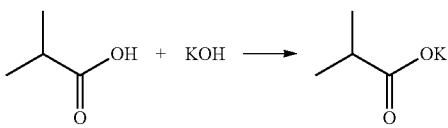

As shown in FIG. 1, washing water and a reaction solution with aldehyde removal are continuously pumped into the water washing tower 7 by their corresponding material transfer pumps. The continuous production system also includes a dehydration tower 8. The dehydration tower 8 is connected with the water washing tower 7. In an embodiment, the dehydration tower 8 is a vacuum dehydration tower 8, the temperature of a tower kettle of the dehydration tower 8 ranges from 150° C. to 160° C., and the pressure of the dehydration tower 8 ranges from −0.09 MPa to −0.1 MPa.

As shown in FIG. 1, the continuous production system also includes an evaporator 9. A heating temperature at the bottom of the evaporator 9 ranges from 250° C. to 300° C. The evaporator 9 further separates the organic phase and the inorganic phase in a crude ester reaction solution from the dehydration tower 8 to purify the crude ester reaction solution, which saves the power consumption. The evaporated gas phase materials are further transferred into a light component removal tower 10 to remove light component impurities.

As shown in FIG. 1, the continuous production system also includes the light component removal tower 10. The light component removal tower 10 removes by-products that are light components from the reaction system. In an embodiment, the light components include pentanediol, etc. The light component removal tower 10 is a negative pressure light component removal tower, the temperature of a tower kettle of the light component removal tower 10 ranges from 155° C. to 160° C., and the pressure of the light component removal tower 10 ranges from −0.09 MPa to −0.12 MPa, for example, −0.1 MPa. The light component removal tower 10 further removes light component impurities (e.g., pentanediol) from the reaction solution, and pentanediol evaporated from the top of the light component removal tower 10 is used as the feedstock of C-16.

As shown in FIG. 1, the continuous production system also includes a device for rectifying the crude ester with the light components have been removed. In some embodiments, the continuous production system also includes a rectifying tower 11, the rectifying tower 11 is a negative pressure rectifying tower, the temperature of a tower kettle of the rectifying tower 11 ranges from 165° C. to 170° C., and the pressure in the rectifying tower 11 ranges from −0.09 MPa to −0.12 MPa, for example −0.1 MPa. The rectifying tower 11 removes the heavy component impurities including by-products such as alcohol ester C-16, and the by-reaction equation is as follows:

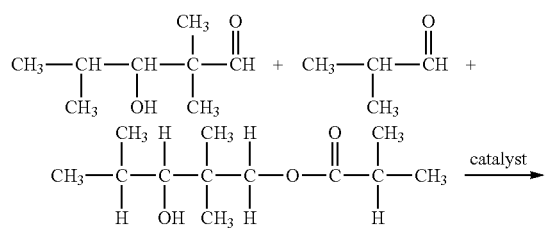

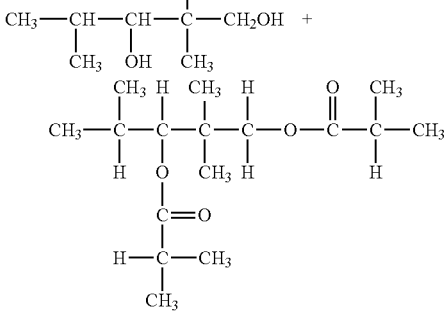

As shown in FIG. 1, a residual solution in the tower kettle of the rectifying tower 11 may be used as part of the feedstock of alcohol ester C-16. The residual solution is transferred to an alcohol ester C-16 feedstock tank 13 for storage. The alcohol ester C-12 evaporated from the top of the rectifying tower 11 is condensed, pumped into a storage tank 12 by corresponding material transfer pumps for storage, and then transported to a packaging room for packing.

Embodiment 1

In an embodiment, a continuous production method for alcohol ester C-12 includes following steps:
(1) Synthetic Esterification Isobutyraldehyde is pumped into the top of a reaction tower 3 from a first feedstock tank 1 at a flow rate of 1.5 tons/hour, and an aqueous solution of potassium hydroxide catalyst is pumped into the top of the reaction tower 3 from a second feedstock tank 2 at a flow rate of 60 kg/hour. The reaction tower 3 has a structure of a square groove reactor and the square groove reactor includes 5 layers of square grooves arranged in series. The feedstock flows from the top of the reaction tower 3 to the bottom of the reaction tower 3. When a liquid level in a tower kettle of the reaction tower 3 reaches 40% of the height of the tower kettle of the reaction tower 3, the bottom of the reaction tower 3 is heated. When the temperature at the bottom of the reaction tower 3 is heated to 80° C., a discharging pump located at the tower kettle of the reaction tower 3 is turned on to pump out the reaction solution. In the embodiment, the height of the reaction tower 3 is 7 m, the diameter of the reaction tower 3 is 800 mm, the height of the square groove located at the bottom of the square groove reactor is 0.6 times an overall height of the reaction tower 3, and a vertical distance h between two adjacent square grooves in the square groove reactor is 300 mm.

(2) Atmospheric Distillation

The reaction solution is continuously pumped into the atmospheric distillation tower 4 to dealdehyde at atmospheric pressure. The temperature of a tower kettle of the atmospheric distillation tower 4 is 160° C., in which case the excess isobutyraldehyde is continuously removed from the top of the atmospheric distillation tower 4 and then returned to the first feedstock tank 1 after three-stage condensation. Finally, the reaction solution with aldehyde removal is pumped into the vacuum distillation tower 6. In the embodiment, the height of the atmospheric distillation tower 4 is 12 m, the diameter of the atmospheric distillation tower 4 is 600 mm, the atmospheric distillation tower 4 is provided with a built-in steel wire mesh packing, and the reflux ratio is 2.

(3) Vacuum Distillation

The reaction solution with aldehyde removal in the atmospheric distillation tower 4 is continuously pumped into the vacuum distillation tower 6 to dealdehyde. The pressure is negative pressure (e.g., −0.09 MPa), the reflux ratio is 2, and the temperature of a tower kettle of the vacuum distillation tower 6 ranges from 160° C. to 170° C. A portion of aldehyde (e.g., isobutyraldehyde) and alcohol (e.g., isobutanol) are discharged from the top of the vacuum distillation tower 6, and a portion of isobutyraldehyde is cycled to the reaction tower 3 for reaction.

(4) Water Washing and Layering

Crude alcohol ester C-12 with aldehyde removal is continuously pumped into the water washing tower 7 (with the height of 12 m, and the diameter of 500 mm) together with water for water washing.

(5) Dehydration Under Decompression

An esterification solution after water washing is pumped into the dehydration tower 8 (with the height of 9 m, and the diameter of 600 mm) to dehydrate at a negative pressure (e.g., −0.092 MPa). In the embodiment, the temperature of a tower kettle of the dehydration tower 8 is 150° C.

(6) Light Components Removal Under Decompression

A crude ester after dehydration is continuously pumped into an evaporator 9, and the heated gas-phase feedstock enters a light component removal tower 10 from the top of the evaporator 9, and light components of the gas-phase feedstock are removed at a negative pressure (e.g., −0.1 MPa) in the light component removal tower 10. In the embodiment, the temperature of a tower kettle of the light component removal tower 10 is 155° C. The light components containing pentanediol are evaporated from the top of the light component removal tower 10 and are used as the feedstock for the production of hexadecanediol ester.

(7) Refining, Heavy Components Removal and Packaging

The crude ester with the light components removal is continuously pumped into the rectifying tower 11 (with the height of 15 m, and the diameter of 600 mm) to distill at a negative pressure (e.g., −0.1 MPa). In the embodiment, the reflux ratio is 3, and the temperature of a tower kettle of the rectifying tower 11 is 165° C. A distillation residue in the tower kettle of the rectifying tower 11 is used as part of the feedstock of hexadecanediol ester. alcohol ester C-12 evaporated from the top of the rectifying tower 11 is condensed and is pumped into a storage tank 12 for storage, and then is transferred to a packaging room for packaging. The purity of the prepared alcohol ester C-12 reaches more than 99.0%, the yield reaches more than 80%, and the total yield reaches more than 95% by adopting the continuous preparation process.

Evaluation

The present disclosure also designs control examples for embodiment 1, where the methods in control examples are similar to that in the embodiment 1, the reaction towers in control examples are different from that in the embodiment 1. The purity and the yield of alcohol ester C-12 are compared among the control examples and the embodiment 1, and the evaluation results are shown in Table 1.

TABLE 1

Comparison of the purity and the yield corresponding to different reaction towers

| embodiment | the height of the reaction tower/m | the diameter of the reaction tower/mm | the number of layers of the square grooves | the height of the square groove located at the bottom of the square groove reactor/m | purity | yield |
| --- | --- | --- | --- | --- | --- | --- |
| embodiment 1 | 7 | 800 | 5 | 4.2 | 99.2% | 82% |
| control example 1 | 5 | 800 | 3 | 3.0 | 97.6% | 79% |
| control example 2 | 7 | 800 | 5 | 2.8 | 95% | 75% |
| control example 3 | 9 | 800 | 8 | 5.4 | 90% | 70% |

As described above, the present disclosure effectively overcomes various defects in the prior art and has a high industrial value. The foregoing embodiments only describe several implementations of the present disclosure, and their description is specific and detailed, but cannot therefore be understood as a limitation to the patent scope of the present disclosure. It should be noted that, a person of ordinary skill in the art may further make several variations and improvements without departing from the concept of the present disclosure, which shall fall within the protection scope of the present disclosure. Therefore, the protection scope of the present disclosure shall be subject to the appended claims.

What is claimed is:

1. A continuous production system for alcohol ester C-12, the system comprising:
    a first feedstock tank and a second feedstock tank arranged in parallel, wherein the first feedstock tank and the second feedstock tank comprise an inlet and an outlet, respectively;
    a reaction tower, wherein a first inlet and a second inlet of the reaction tower are respectively connected with the outlets of the first feedstock tank and the second feedstock tank, wherein the reaction tower comprises a first outlet and a second outlet end; wherein the reaction tower has a structure of an open-top perforated-base square compartment reactor comprising 4 to 6 layers of open-top perforated-base square compartments arranged in series; wherein a height of the reaction tower is in a range of 6 m to 8 m, a diameter of the reaction tower is in a range of 700 mm to 800 mm, a vertical distance between two adjacent open-top perforated-base square compartments in the open-top perforated-base square compartment reactor is in a range of 200 mm to 300 mm, and a height of an open-top perforated-base square compartment located at the bottom of the open-top perforated-base square compartment reactor is 0.5 to 0.6 times an overall height of the reaction tower;
    an atmospheric distillation tower, wherein an inlet of the atmospheric distillation tower is connected with the first outlet of the reaction tower, wherein the atmospheric distillation tower comprises a first outlet and a second outlet;

a condenser, wherein the condenser comprises a first inlet and a second inlet, wherein the first inlet of the condenser is connected with the second outlet of the reaction tower, the second inlet of the condenser is connected with the second outlet of the atmospheric distillation tower, and an outlet of the condenser is connected with the inlet of the first feedstock tank;

a vacuum distillation tower, wherein an inlet of the vacuum distillation tower is connected with the first outlet of the atmospheric distillation tower, wherein the vacuum distillation tower comprises a first outlet and a second outlet, and the second outlet of the vacuum distillation tower is connected with the first inlet of the reaction tower;

a water washing tower, wherein an inlet of the water washing tower is connected with the first outlet of the vacuum distillation tower;

a dehydration tower, wherein an inlet of the dehydration tower is connected with an outlet of the water washing tower;

an evaporator, wherein an inlet of the evaporator is connected with an outlet of the dehydration tower;

a light component removal tower, wherein an inlet of the light component removal tower is connected with an outlet of the evaporator; and a rectifying tower, wherein an inlet of the rectifying tower is connected with an outlet of the light component removal tower.

2. The continuous production system for alcohol ester C-12 according to claim 1, wherein the first feedstock tank, the second feedstock tank, the reaction tower, the atmospheric distillation tower, the vacuum distillation tower, the condenser, the water washing tower, the dehydration tower, the evaporator, the light component removal tower, and the rectifying tower are connected with each other by a plurality of pipelines, and a portion of pipelines are provided with material transfer pumps.

3. The continuous production system for alcohol ester C-12 according to claim 1, wherein the vacuum distillation tower is further provided with a third outlet.

4. The continuous production system for alcohol ester C-12 according to claim 1, wherein the first feedstock tank is used to contain isobutyraldehyde, the second feedstock tank is used to contain an aqueous solution of catalyst, wherein the first feedstock tank and second feedstock tank are connected to the reaction tower by pipelines, and the pipelines are provided with material transfer pumps, and the isobutyraldehyde and the aqueous solution of catalyst are pumped into the reaction tower from top to bottom.

5. The continuous production system for alcohol ester C-12 according to claim 4, wherein a ratio of a mass flow of the isobutyraldehyde to a mass flow of the aqueous solution of the catalyst is (25 to 50):1.

6. The continuous production system for alcohol ester C-12 according to claim 1, the system further comprising:
an alcohol ester C-16 feedstock tank, wherein the alcohol ester C-16 feedstock tank is connected with an outlet at the bottom of the rectifying tower.

\* \* \* \* \*